US011566518B2

(12) United States Patent
Lu et al.

(10) Patent No.: US 11,566,518 B2
(45) Date of Patent: Jan. 31, 2023

(54) METHOD AND SYSTEM FOR DIAGENESIS-BASED ROCK CLASSIFICATION

(71) Applicant: SAUDI ARABIAN OIL COMPANY, Dhahran (SA)

(72) Inventors: Peng Lu, Dhahran (SA); Yin Xu, Dhahran (SA); Hongwen Zhao, Beijing (CN); Libin Liu, Dhahran (SA); David Tang, Dhahran (SA); Wenbin Tan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 361 days.

(21) Appl. No.: 16/806,389

(22) Filed: Mar. 2, 2020

(65) Prior Publication Data

US 2021/0270130 A1  Sep. 2, 2021

(51) Int. Cl.
*E21B 49/00* (2006.01)
*E21B 7/04* (2006.01)
(Continued)

(52) U.S. Cl.
CPC ............... *E21B 49/00* (2013.01); *E21B 7/04* (2013.01); *E21B 44/00* (2013.01); *E21B 49/02* (2013.01);
(Continued)

(58) Field of Classification Search
CPC . E21B 49/00; E21B 49/02; E21B 7/04; E21B 44/00; G01V 1/46; G01V 1/48;
(Continued)

(56) References Cited

U.S. PATENT DOCUMENTS 4,617,825 A   10/1986  Ruhovets
5,444,619 A    8/1995  Hoskins et al.
(Continued)

FOREIGN PATENT DOCUMENTS

CN          108362621 A      8/2018

OTHER PUBLICATIONS

Abarca et al., 3D Reactive Transport Modeling of Porosity Evolution in a Carbonate Reservoir Through Dolomitization, Online: Mar. 20, 2019, Chemical Geology 513, pp. 184-199 (Year: 2019).*
(Continued)

*Primary Examiner* — Toan M Le
(74) *Attorney, Agent, or Firm* — Osha Bergman Watanabe & Burton LLP (57) ABSTRACT

A method may include obtaining various well logs or various core samples regarding a geological region of interest. The method may further include determining various permeability values, various porosity values, and various dolomite volume fraction values regarding the geological region of interest using the well logs or the core samples. The dolomite volume fraction values may correspond to a percentage of dolomite in a total mineral volume. The method may further include determining, using the porosity values, various permeability thresholds corresponding to various predetermined reservoir qualities. The method may further include generating, using the permeability thresholds, the permeability values, and the dolomite volume fraction values, a reservoir model including various dolomite boundaries defining the predetermined reservoir qualities. The method may further include determining a hydrocarbon trap prediction using the reservoir model.

20 Claims, 8 Drawing Sheets

(51) Int. Cl.
| | |
|---|---|
| *E21B 44/00* | (2006.01) |
| *E21B 49/02* | (2006.01) |
| *G01V 1/04* | (2006.01) |
| *G01V 1/46* | (2006.01) |
| *G01V 1/50* | (2006.01) |
| *G01V 99/00* | (2009.01) |
| *E21B 25/00* | (2006.01) |

(52) U.S. Cl.
CPC .............. *G01V 1/04* (2013.01); *G01V 1/46* (2013.01); *G01V 1/50* (2013.01); *G01V 99/005* (2013.01); *E21B 25/00* (2013.01); *G01V 2210/12* (2013.01); *G01V 2210/1429* (2013.01); *G01V 2210/6244* (2013.01); *G01V 2210/6246* (2013.01); *G01V 2210/66* (2013.01)

(58) Field of Classification Search
CPC .. G01V 1/50; G01V 1/306; G01V 2210/1429; G01V 2210/6244; G01V 2210/6246; G01V 2210/66; G01V 2200/20
See application file for complete search history.

(56) References Cited

U.S. PATENT DOCUMENTS

| | | | |
|---|---|---|---|
| 6,751,557 | B1 | 6/2004 | Shehab et al. |
| 9,624,768 | B2 | 4/2017 | Yang |
| 2009/0103677 | A1 | 4/2009 | Wood et al. |
| 2011/0218737 | A1* | 9/2011 | Gulati ............... G01V 1/28 345/419 |
| 2013/0325349 | A1 | 12/2013 | Bunting et al. |
| 2014/0121980 | A1 | 5/2014 | Garcia Leiceaga et al. |
| 2014/0214324 | A1 | 7/2014 | Freedman et al. |
| 2014/0297186 | A1 | 10/2014 | Suarez-Rivera et al. |
| 2014/0358502 | A1 | 12/2014 | Kleine et al. |
| 2015/0198035 | A1 | 7/2015 | de Reynal, Jr. |
| 2016/0040531 | A1 | 2/2016 | Ramakrishnan et al. |
| 2016/0124115 | A1 | 5/2016 | Theologou et al. |
| 2016/0161635 | A1 | 6/2016 | Ramsay et al. |
| 2017/0328847 | A1 | 11/2017 | Hursan et al. |
| 2018/0031732 | A1 | 2/2018 | Mosse et al. |
| 2018/0246254 | A1 | 8/2018 | Wu et al. |
| 2018/0320485 | A1 | 11/2018 | Fei et al. |
| 2019/0145253 | A1 | 5/2019 | Spence et al. |
| 2019/0257973 | A1 | 8/2019 | AlBahrani et al. |
| 2019/0368994 | A1 | 12/2019 | Al Readean et al. |

OTHER PUBLICATIONS

Chandra, V et al. "Effective integration of reservoir rock-typing and simulation using near-wellbore upscaling" 2015 Marine and Petroleum Geology, 67, 307-326 (20 pages).
Gomes, J. S. et al. "Carbonate reservoir rock typing-the link between geology and SCAL" n Abu Dhabi International Petroleum Exhibition and Conference. Society of Petroleum Engineers. 2008 SPE-118284-MS (14 pages).
Hollis, C. et al. "Pore system characterisation in heterogeneous carbonates: An alternative approach to widely-used rock-typing methodologies" Marine and Petroleum Geology, 27(4), 772-793, 2010 (22 pages).
Mirzaei-Paiaman, A. et al. "A new approach in petrophysical rock typing" Journal of Petroleum Science and Engineering, 166, 445-464, 2018 (20 pages).
Rebelle, M. et al. "Pore to grid carbonate rock-typing" In International Petroleum Technology Conference, International Petroleum Technology Conference, 2009 IPTC-13120-MS (9 pages).
Rebelle, M. et al. "Rock-typing in carbonates: a critical review of clustering methods" In Abu Dhabi International Petroleum Exhibition and Conference, Society of Petroleum Engineers, SPE-171759-MS, 2014 (14 pages).
Sailer, Arthur H. and Nuel Henderson, "Distribution of Porosity and Permeability in Platform Dolomites: Insight from the Permian of West Texas", AAPG Bulletin, The American Association of Petroleum Geologists, vol. 82, No. 8, Aug. 1998, pp. 1528-1550 (23 pages).
Sailer, Arthur H., "Palaeozoic dolomite reservoirs in the Permian Basin, SW USA: stratigraphic distribution, porosity, permeability and production", The Geometry and Petrogenesis of Dolomite Hydrocarbon Reservoirs, The Geological Society of London, vol. 235, 2004, pp. 309-323 (15 pages).
Lucia, F.J. and R.P. Major, "Porosity evolution through hypersaline reflux dolomitization", Spec. Pubis Int. Ass. Sediment., The International Association of Sedimentologists, vol. 21, May 1994, pp. 325-341 (9 pages).
Lucia, F. Jerry, "Rock-Fabric/Petrophysical Classification of Carbonate Pore Space for Reservoir Characterization", AAPG Bulletin, The American Association of Petroleum Geologists, vol. 79, No. 9, Sep. 1995, pp. 1275-1300 (26 pages).
Machel, Hans G., "Concepts and models of dolomitization: a critical reappraisal", The Geometry and Petrogenesis of Dolomite Hydrocarbon Reservoirs, Geology Society of London, vol. 235, 2004, pp. 7-63 (57 pages).
Rodgers, John, "Terminology of Limestone and Related Rocks: An Interim Report", Journal of Sedimentary Petrology, vol. 24, No. 4, Dec. 1954, pp. 225-234 (10 pages).
International Search Report issued in corresponding International Application No. PCT/US2020/023601, dated Nov. 25, 2020 (4 pages).
Written Opinion issued in corresponding International Application No. PCT/US2020/023601, dated Nov. 25, 2020 (7 pages).

* cited by examiner

METHOD AND SYSTEM FOR DIAGENESIS-BASED ROCK CLASSIFICATION

BACKGROUND

Rock within a subsurface formation may be formed from various materials. For example, rock may be composed of minerals, organic matter, volcanic glass, etc. Thus, rocks may be characterized by different rock types such as, for example, sedimentary rocks like sandstone and limestone, igneous rocks, and metamorphic rocks. Accordingly, a subsurface formation may be classified according to various rock types within the subsurface formation.

SUMMARY

In general, in one aspect, embodiments relate to a method that includes obtaining, by a computer processor, various well logs or various core samples regarding a geological region of interest. The method further includes determining, by the computer processor, various permeability values, various porosity values, and various dolomite volume fraction values regarding the geological region of interest using the well logs or the core samples. The dolomite volume fraction values correspond to a percentage of dolomite in a total mineral volume. The method further includes determining, by the computer processor and using the porosity values, various permeability thresholds corresponding to various predetermined reservoir qualities. The method further includes generating, by the computer processor and using the permeability thresholds, the permeability values, and the dolomite volume fraction values, a reservoir model including various dolomite boundaries defining the predetermined reservoir qualities. The method further includes determining, by the computer processor, a hydrocarbon trap prediction using the reservoir model.

In general, in one aspect, embodiments relate to a system that includes a logging system coupled to various logging tools. The system further includes a reservoir simulator including a computer processor, where the reservoir simulator is coupled to the logging system. The reservoir simulator obtains various well logs from the logging tools or various core samples regarding a geological region of interest. The reservoir simulator further determines various permeability values, various porosity values, and various dolomite volume fraction values regarding the geological region of interest using the well logs or the core samples. The dolomite volume fraction values correspond to a percentage of dolomite in a total mineral volume. The reservoir simulator further determines, using the porosity values, various permeability thresholds corresponding to various predetermined reservoir qualities. The reservoir simulator further generates, using the permeability thresholds, the permeability values, and the dolomite volume fraction values, a reservoir model including various dolomite boundaries defining the plurality of predetermined reservoir qualities. The reservoir simulator further determines a hydrocarbon trap prediction using the reservoir model.

In general, in one aspect, embodiments relate to a non-transitory computer readable medium storing instructions executable by a computer processor. The instructions obtain various well logs or various core samples regarding a geological region of interest. The instructions further determine various permeability values, various porosity values, and various dolomite volume fraction values regarding the geological region of interest using the well logs or the core samples. The dolomite volume fraction values correspond to a percentage of dolomite in a total mineral volume. The instructions further determine, using the porosity values, various permeability thresholds corresponding to various predetermined reservoir qualities. The instructions further generate, using the permeability thresholds, the permeability values, and the dolomite volume fraction values, a reservoir model including various dolomite boundaries defining the predetermined reservoir qualities. The instructions further determine a hydrocarbon trap prediction using the reservoir model.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 3.1 and 3.2 show examples in accordance with one or more embodiments.

FIGS. 5.1 and 5.2 show examples in accordance with one or more embodiments.

FIGS. 6.1 and 6.2 show a computing system in accordance with one or more embodiments.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for generating and using a reservoir model using dolomite and dolomitic limestone boundaries obtained from permeability values, porosity values, and dolomite volume fraction values. In particular, the process of dolomitization may affect the reservoir quality of a subsurface formation by producing a new grain-pore framework at the expense of eliminating the original limestone fabrics. In other words, the dolomitization process may redistribute pore structures and pore connectivity within a geological region over time. As such, dolomite may have a lower total porosity value with respect to a given permeability value than what is found in limestone. In other words, porosity values may decrease with the increasing of dolomite volume fraction that illustrates a progression of dolomitization process.

More specifically, embodiments may be directed at analyzing a carbonate reservoir. For example, carbonate rocks may be mainly composed of calcite and dolomite, while the minor non-carbonate minerals in the carbonate rock may include anhydrite and a small amount of silicate minerals (e.g., quartz, feldspar and clay minerals). If a carbonate rock is primarily composed of calcite, it is called limestone, but if it is dominantly made of the mineral dolomite, the rock may be classified as dolomite.

Furthermore, rock classification schemes may divide reservoir rocks into separate distinct groups that have different petrophysical properties. Where many rock classification schemes focus primarily on classifying depositional lithofacies based on a porosity-versus-permeability analysis, the effects of diagenesis (e.g., dolomitization) on reservoir quality are often ignored. Here, a diagenesis-based rock classifying scheme for carbonate rocks may use the effects of dolomitization to describe different reservoir regions within a geological region of interest. Using this information regarding dolomitization, a hydrocarbon trap may be identified within a geological region of interest. Based on reservoir characteristics of the hydrocarbon trap, a reservoir simulator may predict hydrocarbon production from the geological region of interest as well as adjust well trajectory designs performed by the drilling system.

Figure 1:
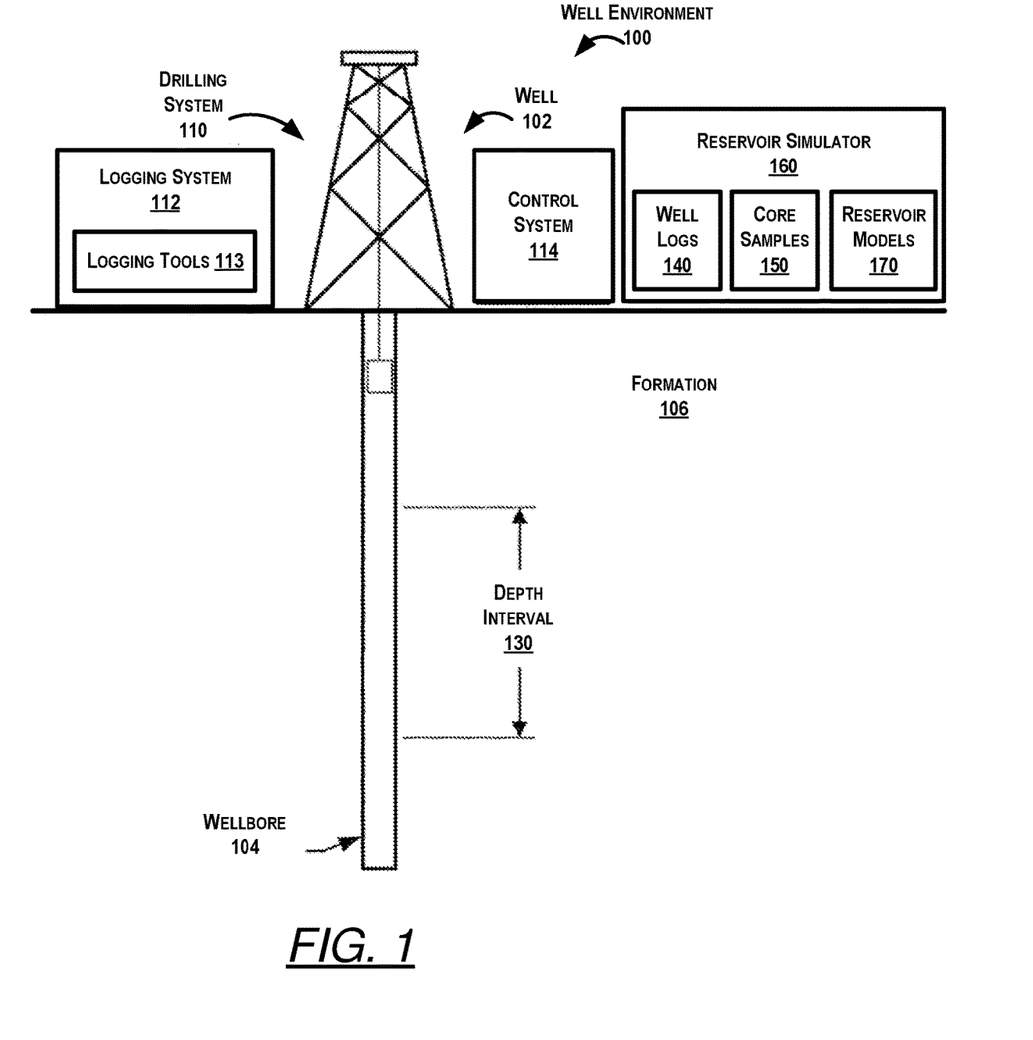
FIG. 1 shows a system in accordance with one or more embodiments.

Turning to FIG. 1, FIG. 1 shows a schematic diagram in accordance with one or more embodiments. As shown in FIG. 1, FIG. 1 illustrates a well environment (100) that may include a well (102) having a wellbore (104) extending into a formation (106). The wellbore (104) may include a bored hole that extends from the surface into a target zone of the formation (106), such as a reservoir. The formation (106) may include various formation characteristics of interest, such as formation porosity, formation permeability, resistivity, water saturation, free water level (FWL), and the like. Porosity may indicate how much space exists in a particular rock within an area of interest in the formation (106), where oil, gas, and/or water may be trapped. Permeability may indicate the ability of liquids and gases to flow through the rock within the area of interest. Resistivity may indicate how strongly rock and/or fluid within the formation (106) opposes the flow of electrical current. For example, resistivity may be indicative of the porosity of the formation (106) and the presence of hydrocarbons. More specifically, resistivity may be relatively low for a formation that has high porosity and a large amount of water, and resistivity may be relatively high for a formation that has low porosity or includes a large amount of hydrocarbons. Water saturation may indicate the fraction of water in a given pore space.

Keeping with FIG. 1, the well environment (100) may include a drilling system (110), a logging system (112), a control system (114), and a reservoir simulator (160). The drilling system (110) may include a drill string, drill bit, a mud circulation system and/or the like for use in boring the wellbore (104) into the formation (106). The control system (114) may include hardware and/or software for managing drilling operations and/or maintenance operations. For example, the control system (114) may include one or more programmable logic controllers (PLCs) that include hardware and/or software with functionality to control one or more processes performed by the drilling system (110). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

Figure 61:
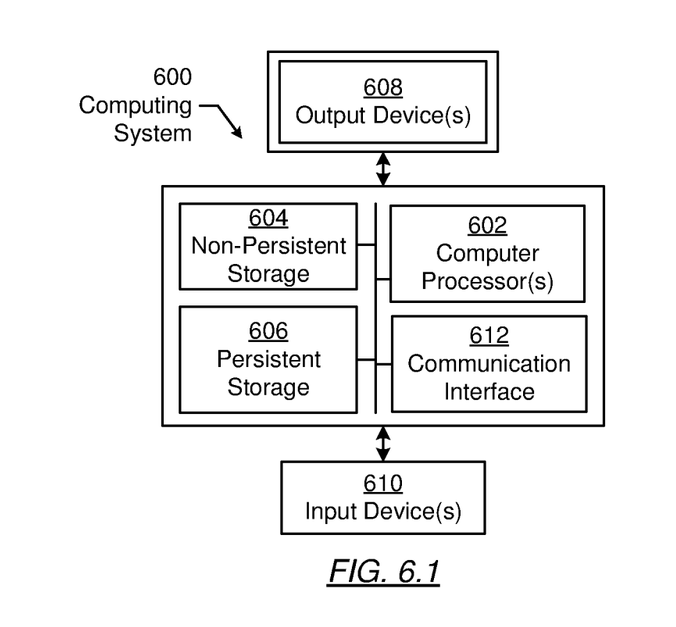
Figure 62:
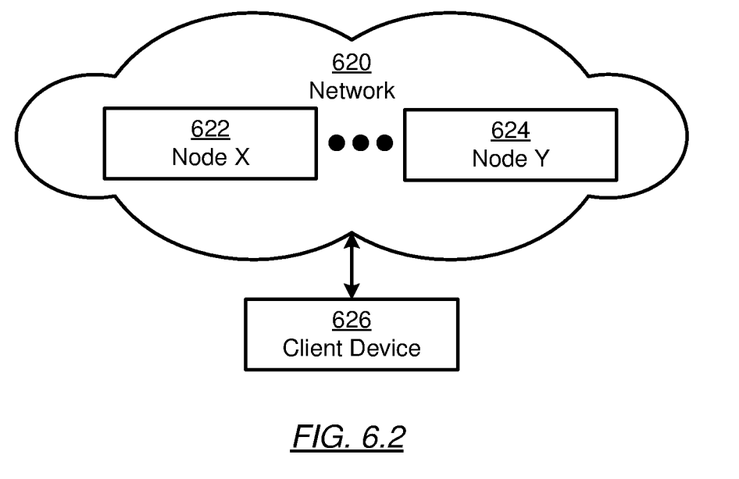

A reservoir simulator (160) may include hardware and/or software with functionality for generating one or more reservoir models (170) regarding the formation (106). For example, the reservoir simulator (160) may store well logs (140) and data regarding core samples (150), and further analyze the well log data, the core sample data, seismic data, and/or other types of data to generate and/or update the one or more reservoir models (170). In some embodiments, the control system (114), the logging system (112), and/or the reservoir simulator (160) may include a computer system that is similar to the computer system (600) described below with regard to FIGS. 6.1 and 6.2 and the accompanying description.

The logging system (112) may include one or more logging tools (113), such as a nuclear magnetic resonance (NMR) logging tool and/or a resistivity logging tool, for use in generating well logs (140) of the formation (106). For example, a logging tool may be lowered into the wellbore (104) to acquire measurements as the tool traverses a depth interval (130) (e.g., targeted reservoir section) of the wellbore (104). The plot of the logging measurements versus depth may be referred to as a "log" or "well log". Well logs (104) may provide depth measurements of the well (102) that describe such reservoir characteristics as formation porosity, formation permeability, resistivity, water saturation, and the like. The resulting logging measurements may be stored and/or processed, for example, by the control system (114), to generate corresponding well logs (140) for the well (102). A well log may include, for example, a plot of a logging response time vs true vertical depth (TVD) across the depth interval (130) of the wellbore (104).

Reservoir characteristics may be determined using a variety of different techniques. For example, certain reservoir characteristics can be determined via coring (e.g., physical extraction of rock samples) to produce core samples (150) and/or logging operations (e.g., wireline logging, logging-while-drilling (LWD) and measurement-while-drilling (MWD)). Coring operations may include physically extracting a rock sample from a region of interest within the wellbore (104) for detailed laboratory analysis. For example, when drilling an oil or gas well, a coring bit may cut plugs (or "cores") from the formation (106) and bring the plugs to the surface, and these core samples may be analyzed at the surface (e.g., in a lab) to determine various characteristics of the formation (106) at the location where the sample was obtained.

Multiple types of logging techniques are available for determining various reservoir characteristics, and a particular form of logging may be selected and used based on the logging conditions and the type of desired measurements. For example, NMR logging measures the induced magnetic moment of hydrogen nuclei (i.e., protons) contained within the fluid-filled pore space of porous media (e.g., reservoir rocks). Thus, NMR logs may measure the magnetic response of fluids present in the pore spaces of the reservoir rocks. In so doing, NMR logs may measure both porosity and permeability, as well as the types of fluids present in the pore spaces. For determining permeability, another type of logging may be used that is called spontaneous potential (SP) logging. SP logging may determine the permeabilities of rocks in the formation (106) by measuring the amount of electrical current generated between drilling fluid produced by the drilling system (110) and formation water that is held in pore spaces of the reservoir rock. Porous sandstones with high permeabilities may generate more electricity than impermeable shales. Thus, SP logs may be used to identify sandstones from shales.

To determine porosity in the formation (106), various types of logging techniques may be used. For example, the logging system (112) may measure the speed that acoustic waves travel through rocks in the formation (106). This type of logging may generate borehole compensated (BHC) logs, which are also called sonic logs. In general, sound waves may travel faster through high-density shales than through lower-density sandstones. Likewise, density logging may also determine porosity measurements by directly measuring the density of the rocks in the formation (106). Furthermore, neutron logging may determine porosity measurements by assuming that the reservoir pore spaces within the formation (106) are filled with either water or oil and then measuring the amount of hydrogen atoms (i.e., neutrons) in the pores.

Keeping with the various types of logging techniques, resistivity logging may measure the electrical resistivity of rock or sediment in and around the wellbore (104). In particular, resistivity measurements may determine what types of fluids are present in the formation (106) by measuring how effective these rocks are at conducting electricity. Because fresh water and oil are poor conductors of electricity, they have high resistivities. As such, resistivity measurements obtained via such logging can be used to determine corresponding reservoir water saturation ($S_w$).

In some embodiments, the reservoir simulator (160) is implemented in a software platform for a control system (114) for drilling. The software platform may obtain data acquired by the drilling system (110) and logging system (112) as inputs, which may include multiple data types from multiple sources. The software platform may aggregate the data from these systems (110, 112) in real time for rapid analysis. As such, the output of the reservoir simulator (160) may be a near real-time reservoir/non-reservoir distribution map of the formation (106) in dolomitized carbonates.

In some embodiments, a well trajectory design for the wellbore (104) is updated based on an updated reservoir model by the control system (114), e.g. a well design module responsible for managing well trajectory. For example, a reservoir simulator (160) may communicate changes in a reservoir model for a geological region of interest to the control system (114), wherein the control system subsequently adjusts a well trajectory design accordingly. As such, the control system (114) may generate one or more control signals for drilling equipment based on the updated well trajectory design and/or reservoir model to control drilling by the drilling system (110). In particular, the control system may modify the well trajectory in order to pass a drill bit through good reservoir regions and/or to avoid tight dolomite (e.g., drilling problems may be encountered in a severe dolomitized area, such as loss of circulation). Thus, a reservoir model describing dolomite boundaries and various types of reservoir regions may enable drillers to collaboratively design a drill trajectory using the reservoir model. Such a reservoir model may also provide drilling engineers and a rig site to continuously monitor and analyze drilling operations for an individual well or a group of rigs.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2:
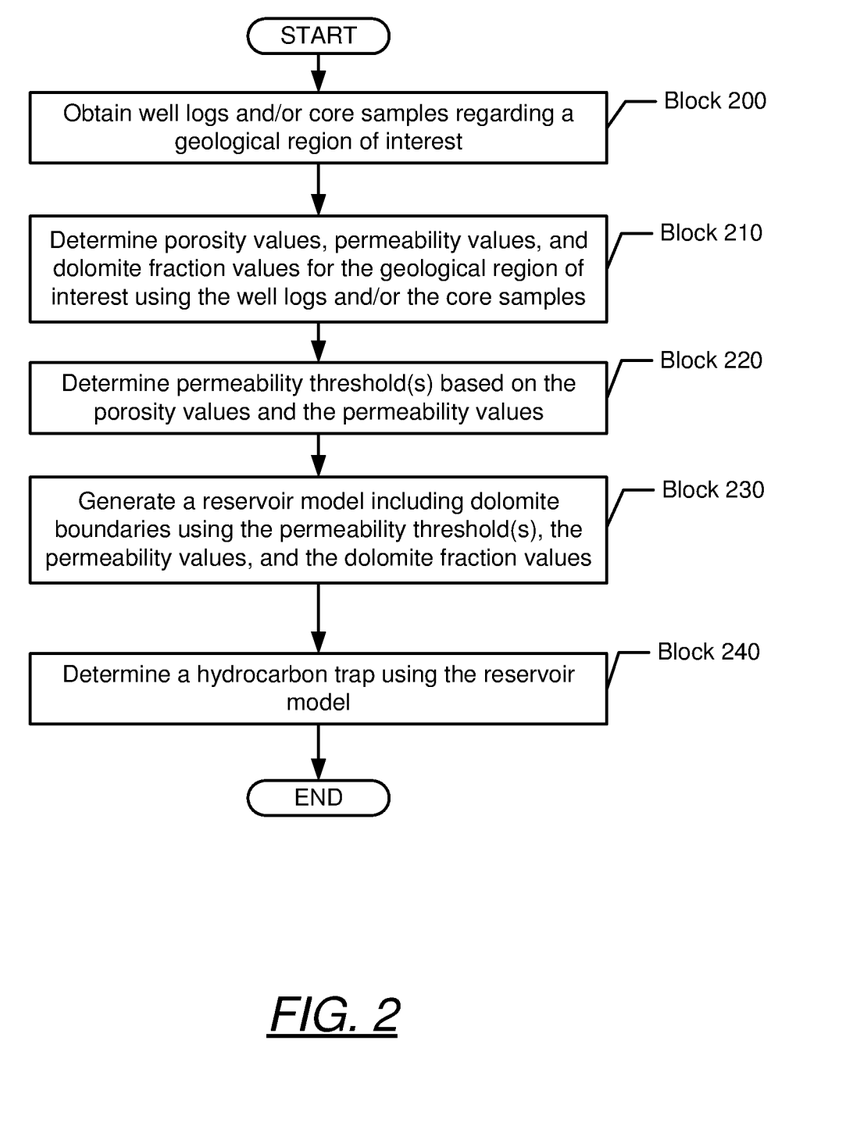
FIG. 2 shows a flowchart in accordance with one or more embodiments.

Turning to FIG. 2, FIG. 2 shows a flowchart in accordance with one or more embodiments. Specifically, FIG. 2 describes a general method for generating a reservoir model and/or predicting a hydrocarbon trap using the reservoir model. One or more blocks in FIG. 2 may be performed by one or more components (e.g., reservoir simulator (160)) as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, various well logs and/or various core samples are obtained regarding a geological region of interest in accordance with one or more embodiments. For example, well logs may be acquired using a logging system (112) and/or logging tools (113) described above in FIG. 1 and the accompanying description. The core samples may be obtained by different types of coring tools used in conventional coring or sidewall coring. For example, conventional coring tools may include a rotary core bit and a coring barrel used in a drilling system. Sidewall coring may include a sidewall coring gun.

In some embodiments, the geological region of interest corresponds to an area of a subterranean formation that may be desired for further analysis, such as for a prospective drilling operation. Likewise, the geological region of interest may be an area that is being drilling in real time or an area being simulated for a future well.

In Block 210, various porosity values, permeability values, and dolomite fraction values are determined for a geological region of interest using well logs and/or core samples in accordance with one or more embodiments. For example, different types of well logs may provide different reservoir characteristics, such as porosity values and/or permeability values for a particular depth interval within the geological region of interest. Likewise, core samples may also be used to determine porosity and/or permeability values. The dolomite fraction values may be obtained from lithology samples, such as core samples. In some embodiments, dolomite fraction values are obtained through thin-section point counting and/or quantitative X-ray diffraction analysis. In particular, thin-section point-counting may determine an approximate modal composition of the rock by selecting a predetermined number of points in a thin section that are described and recorded at each observed point. These points may be compiled together to determine the rock composition.

In Block 220, one or more permeability thresholds are determined based on porosity values and permeability values in accordance with one or more embodiments. For examples, a predetermined permeability value may correspond to a cut-off value for different types of rock, such as different diagenetic rock types. In some embodiments, for example, a permeability threshold may be defined in terms of sealing capacity of a hydrocarbon deposit. In contrast to other types of reservoir characteristic thresholds, permeability thresholds may be used in a predetermined rock classification scheme to account for limestone and dolomite having different reservoir qualities due to their different pore connectivity and grain size distribution while having similar porosity values.

To determine a permeability threshold, in some embodiments, a permeability value (e.g., 0.1 md) is selected based on a porosity-versus-permeability analysis. In such an analysis, a selected value may be below a permeability level where a rock is considered as non-reservoir quality for a carbonate reservoir region of interest. Moreover, a permeability threshold value may vary for carbonate rocks from different locations, geological settings, and/or based on different company practices. In some embodiments, a permeability threshold corresponds to a predetermined sealing capacity of a rock region, e.g., the predetermined threshold may distinguish a seal region from a non-seal region.

Figure 31:
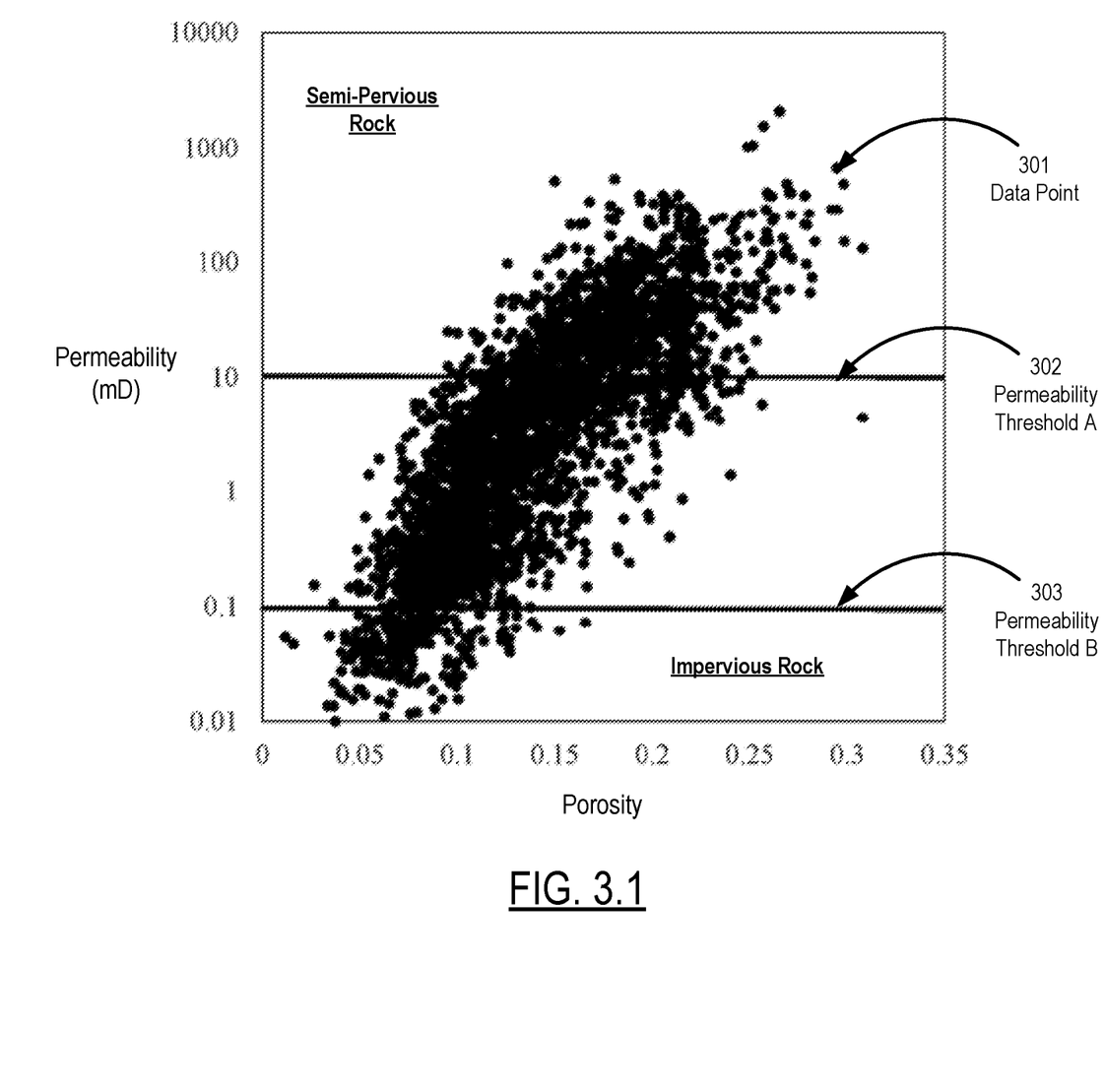

Turning to FIG. 3.1, FIG. 3.1 illustrates an example porosity-versus-permeability diagram in accordance with one or more embodiments. In FIG. 3.1, multiple data points (e.g., data point (301)) are shown disposed along a porosity axis and a permeability axis based on their respective reservoir characteristic values. As shown in FIG. 3.1, permeability is illustrated as a function of porosity. Where increased permeability corresponds to increased reservoir quality, various permeability thresholds (i.e., permeability threshold A (302), permeability threshold (303)) may be reservoir thresholds that distinguish these different levels of reservoir quality in a geological region of interest. Here, two lines within the diagram correspond to two separate permeability thresholds as a function of variable porosity values. The permeability thresholds (302, 303) divide data points of carbonate rocks into three subsets (e.g., a non-reservoir region, fair and good reservoirs regions).

In some embodiments, a boundary line is defined in the porosity-versus-permeability diagram based on a permeability threshold as a function of variable porosity values. As shown in FIG. 3.1, permeability values above the permeability threshold A (302) correspond to semi-pervious rock types. On the other hand, permeability values below the permeability threshold B (303) correspond to impervious rock types. Likewise, permeability values between permeability threshold A (302) and permeability threshold B (303) are in between the semi-pervious and impervious thresholds. While two permeability thresholds are shown in FIG. 3.1, in other embodiments, three or more permeability thresholds may be used to classify different rock types and regions of a subsurface formation.

Figure 51:
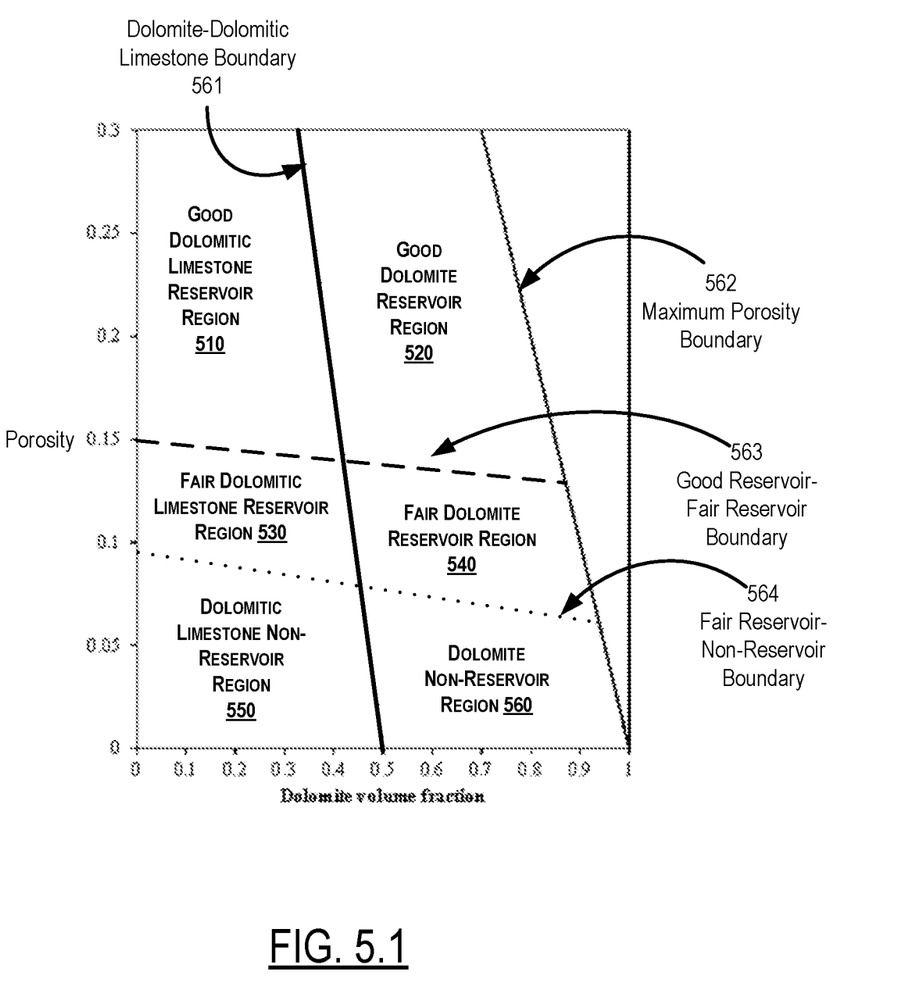
Figure 52:
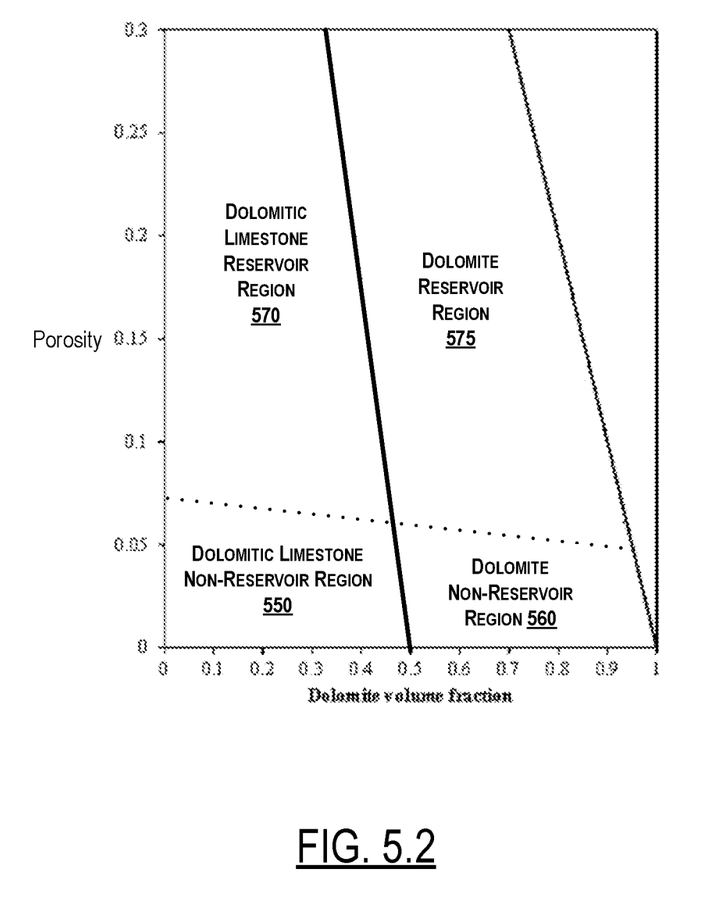

Furthermore, data points from well logs and core samples that fall on a permeability threshold may be extracted, except where the data points include a dolomite fraction of zero (i.e., corresponding to pure limestone). These extracted data points may be projected into a porosity-versus-dolomite-volume-fraction diagram, similar to the ones shown in FIGS. 5.1 and 5.2 below. For example, data points with a dolomite volume fraction value of zero (e.g., pure limestone) may have large variations in porosity values. Linear regressions of the extracted data points can thus generate a boundary line for a reservoir region that defines the dolomite and reservoir boundaries between non-reservoir and fair reservoir in the porosity-versus-dolomite volume fraction diagram.

Returning to FIG. 2, in Block 230, a reservoir model is generated that includes dolomite boundaries based on one or more permeability thresholds, various permeability values, and various dolomite fraction values in accordance with one or more embodiments. For example, a reservoir model may include dolomite boundaries along with other reservoir boundary types, such as a fair-good reservoir boundary and a non-reservoir boundary, while also including more specific boundary types such as dolomite boundaries. For example, a dolomite boundary may include a dolomite-dolomitic limestone boundary or a boundary between good dolomite reservoir and fair dolomite reservoir.

Moreover, these reservoir boundaries may be used to perform diagenesis-based rock classification within a reservoir model. Accordingly, in some embodiments, the reservoir model includes various dolomite regions and dolomitic limestone regions. For example, six rock types may be classified based on three reservoir boundaries defined: good dolomitic limestone reservoir, good dolomite reservoir, fair dolomitic limestone reservoir, fair dolomite reservoir, dolomitic limestone non-reservoir, and dolomite non-reservoir. For an example of such a reservoir model, see FIGS. 5.1 and 5.2 and the accompanying description below.

In some embodiments, a reservoir model combines fair and good reservoir regions to produce a single reservoir region. As such, the rock classification may correspond to a dolomitic limestone reservoir region, a dolomite reservoir region, a dolomitic limestone non-reservoir region, and a dolomite non-reservoir region. In corroboration with various geological models, the diagenesis-based rock classification scheme may be based on various predetermined levels of reservoir quality. As such, a reservoir model may be used for hydrocarbon resource assessment based on the spatial distributions of reservoir regions and non-reservoir regions in a geological region of interest, and especially for carbonate reservoirs.

In Block 240, a hydrocarbon trap is determined using a reservoir model in accordance with one or more embodiments. For example, a hydrocarbon trap may include the existence of a hydrocarbon reservoir, and a barrier (or seal) with high enough entry pressure to retain a predetermined volume of hydrocarbons. Likewise, a hydrocarbon trap may correspond to a stratigraphic trap containing hydrocarbons, bounded on one or more sides by seals of abrupt changes in rock properties, faults, pinch-outs, or unconformities. In some embodiments, stratigraphic traps are adjacent to unconformities within a subsurface formation. Thus, stratigraphic traps that are not adjacent to unconformities may include facies-change traps and diagenetic traps. A stratigraphic trap that is formed primarily due to the diagenetic processes may be called a diagenetic trap. In contrast, stratigraphic traps that are adjacent to unconformities may include hydrocarbon traps proximate an unconformity surface. As such, a stratigraphic trap may correspond to a particular layout of geological body formed as a result of depositional, erosional, or diagenetic processes (e.g., dolomitization).

Although shale and evaporite are common seals for a hydrocarbon trap, tight dolomite may also be a seal. For a seal to be effective in storing hydrocarbons, the seal may require a minimum displacement pressure (or capillary entry pressure) of the lithological body be greater than the buoyancy pressure of a hydrocarbon column in an accumulation underlying a seal. Likewise, a permeability value may be determined in terms of sealing capacity within a rock formation to distinguish seal regions of a reservoir model from non-seal regions based on capillary entry pressure, pore throat and permeability values, and flow test of the wells. For example, a lower boundary of a rock classification scheme may vary depending on different criteria for producing an effective seal for oil and/or gas. In some embodiments, the reservoir model automatically identifies one or more dolomitic limestone seal facies and/or one or more dolomite seal facies using a diagenesis-based rock classification scheme.

In some embodiments, the sealing capacity of various rock regions is evaluated in a reservoir model based on displacement pressure (or capillary entry pressure), pore throat size distribution and flow test of wells to predict hydrocarbon prospects within a formation. Likewise, the reservoir model may be used for facies modeling in geological region of interest, such as for facilitating stratigraphic and diagenetic trap identification in a carbonate reservoir of interest.

In some embodiments, a reservoir model may obtain regular updates during drilling operations regarding data points within a geological region of interest. For example, the updates may include additional permeability values, porosity values, and dolomite fraction values from previously explored regions. As such, the reservoir model may be updated in real-time using the acquired data based on real-time measurements acquired while drilling.

Figure 32:
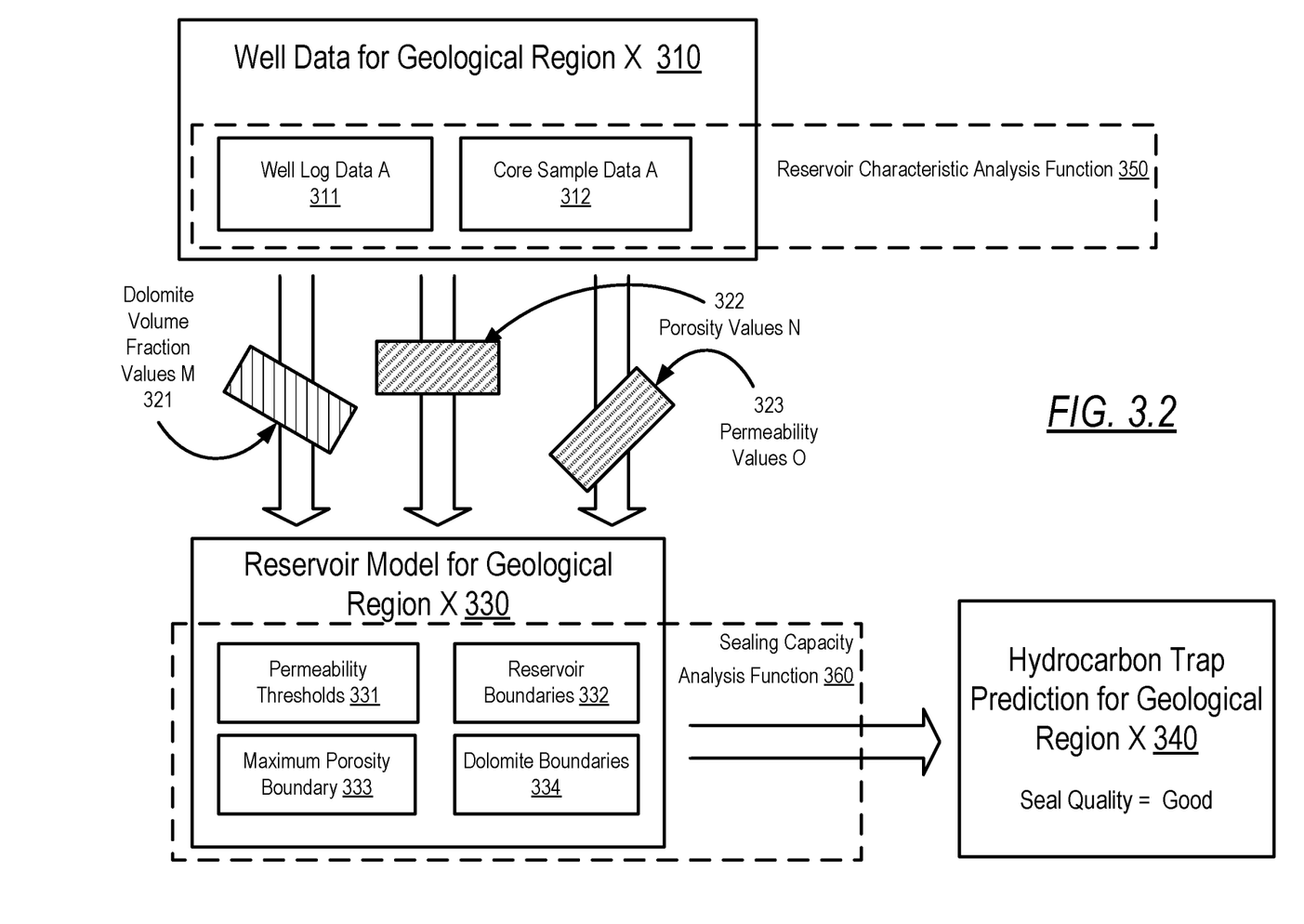

Turning to FIG. 3.2, FIG. 3.2 provides an example of generating a reservoir model using a diagenesis-based rock classification scheme for carbonate reservoirs. The following example is for explanatory purposes only and not intended to limit the scope of the disclosed technology.

In FIG. 3.2, well data (310) is collected regarding a geological region X. In particular, the well data (310) includes well log data A (311) and core sample data A (312). Here, a reservoir characteristic analysis function (350) is performed on the well data (310) by a reservoir simulator to determine dolomite volume fraction values M (321), porosity values N (322), and permeability values O (323) for the geological region X. For example, the reservoir characteristic analysis function (350) may be performed by a reservoir simulator at a well site.

Keeping with FIG. 3.2, a reservoir simulator may generate a reservoir model (330) for the geological region X using dolomite-volume-fraction values M (321), porosity values N (322), and permeability values O (323) for the geological region X. More specifically, the reservoir model (330) may include various permeability thresholds (331), various reservoir boundaries (332), a predetermined maximum porosity boundary (333), and dolomitic limestone boundaries (334). The reservoir simulator may subsequently perform a sealing capacity analysis function (360) on the geological region X using the reservoir boundaries (332) and the dolomite boundaries (334) to determine a hydrocarbon trap prediction (340) for the geological region X. As shown in FIG. 3.2, the reservoir simulator subsequently determines that a hydrocarbon trap in the geological region X has a predetermined level of seal quality that is "good."

Figure 4:
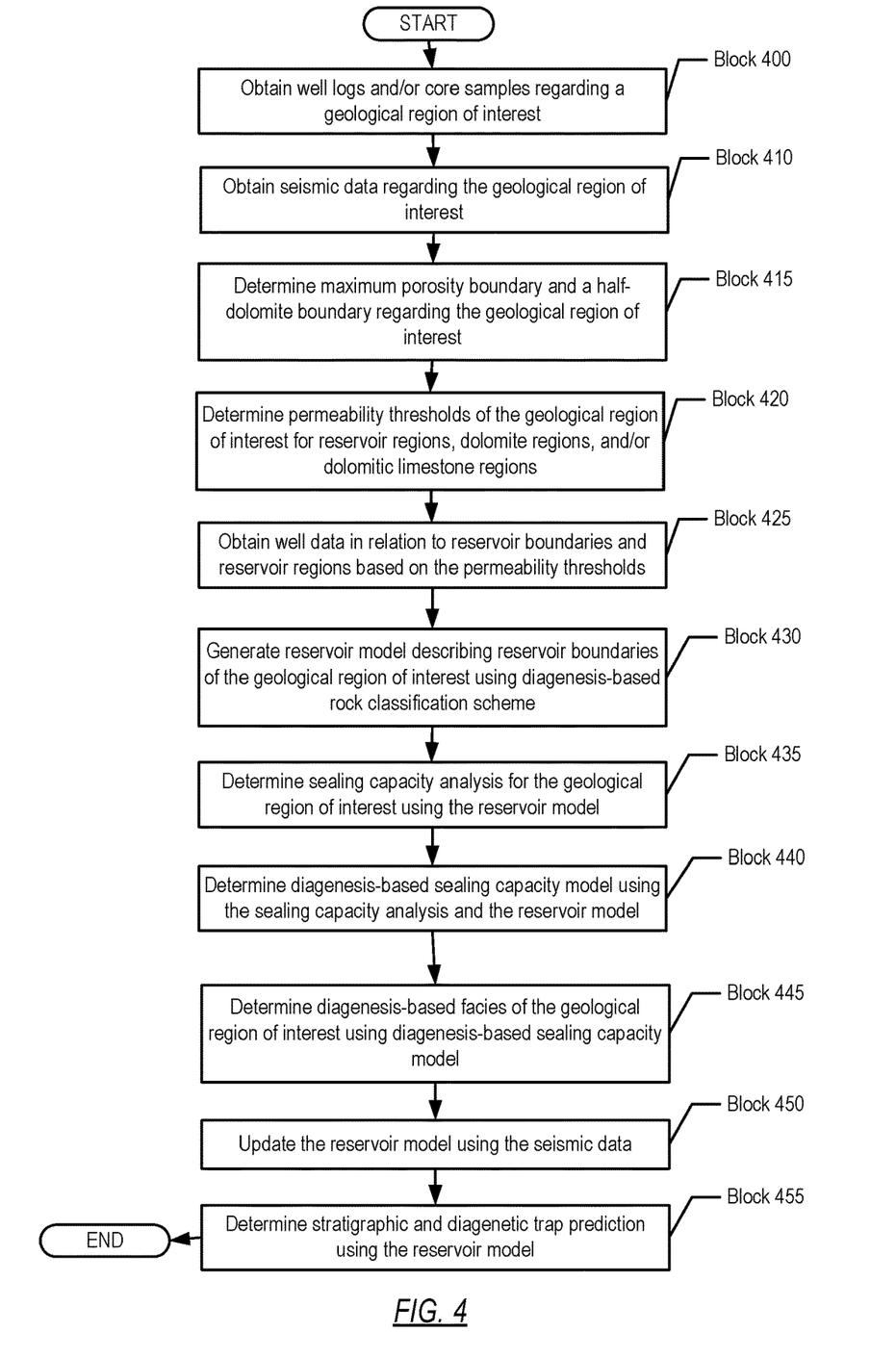
FIG. 4 shows a flowchart in accordance with one or more embodiments.

Turning to FIG. 4, FIG. 4 shows a flowchart in accordance with one or more embodiments. Specifically, FIG. 4 describes a method for determining a stratigraphic or diagenetic trap prediction using a reservoir model. One or more blocks in FIG. 4 may be performed by one or more components (e.g., reservoir simulator (160)) as described in FIG. 1. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, well logs and/or core samples are obtained regarding a geological region of interest in accordance with one or more embodiments. For example, well logs and/or core samples may be obtained in a similar manner as described above in FIG. 1, Block 200 from FIG. 2, and the accompanying description.

In Block 410, seismic data is obtained regarding a geological region of interest in accordance with one or more embodiments. For example, seismic data may be acquired from a seismic survey of the geological region of interest. In particular, seismic sources may be used to image a formation within a subsurface using pressure waves produced by the seismic sources. Seismic receivers may measure the pressure waves to generate seismic data accordingly.

Furthermore, in some embodiments, an area with 3-D seismic coverage may be selected for the geological region of interest. In order to generate a reservoir model based on a diagenesis-based rock typing scheme, diagenesis-based rock classification scheme may be performed with data regarding a subset of the geological region of interest and then the resulting reservoir model may be upscaled for facies modeling. For more information on upscaling the reservoir model, see Block 450 and the accompanying description below.

In Block 415, a maximum porosity boundary and a half-dolomite boundary are determined regarding a geological region of interest in accordance with one or more embodiments. For example, where a carbonate rock is composed of only dolomite and porosity, a maximum porosity value of this rock should be equal to one minus a dolomite volume fraction (DVF) (i.e., 1−DVF value). A dolomite volume fraction value may be defined as the volume of a constituent volume component $V_i$ divided by the total volume of a rock $V$. More specifically, the dolomite volume fraction may be expressed using the following equation:

$$\text{Dolomite volume fraction} = (\text{Dolomite volume})/(\text{Porosity} + \text{Calcite volume} + \text{Volume of other components}) \quad \text{Equation 1}$$

The dolomite volume fraction defined in Equation 1 may define a theoretical maximum porosity line in a porosity-versus-dolomite-volume-fraction diagram for determining a reservoir model. For example, the dolomitization process may be expressed by the following equation:

$$(2-x)CaCO_3(\text{Calcite}) + Mg^{2+} + xCO_3^{2-} = CaMg(CO_3)_2 \\ (\text{Dolomite}) + (1-x)Ca^{2+} \quad \text{Equation (2)}$$

where the value of x may range from 0 to 1.

Furthermore, a dolomitization process may be associated with a calcium sulfate (e.g., gypsum or anhydrite) formation process. If dolomitizing fluids in the formation process include a certain amount of sulphate (e.g., seawater or hypersaline brine) and are involved in the dolomitization process of Equation 1, the displaced $Ca^{2+}$ may react with $SO_4^{2-}$ to form gypsum or anhydrite cement as shown by the following equations:

$$Ca^{2+} + SO_4^{2-} + 2H_2O \rightarrow CaSO_4:2H_2O(\text{gypsum}) \quad \text{Equation (3)}$$

$$Ca^{2+} + SO_4^{2-} \rightarrow CaSO_4(\text{anhydrite}) \quad \text{Equation (4)}$$

More specifically, increasing temperature may drive the gypsum to an anhydrite transformation. Anhydrite may thus be formed at the expense of gypsum during progressive rock burial. If a carbonate rock contains some anhydrite, the maximum porosity should be equal to the mathematical expression, (1−Dolomite volume fraction−Anhydrite volume fraction).

Thus, in some embodiments, a predetermined maximum porosity line is adjusted based on values an anhydrite volume fraction and/or other mineral composition found alongside dolomite.

In Block 420, various permeability thresholds of a geological region of interest are determined based on porosity values and permeability values in accordance with one or more embodiments. For example, permeability thresholds may be determined using porosity values and permeability values in a similar manner as described above in Blocks 210 and 220 from FIG. 2, and the accompanying description.

In Block 425, well data is obtained in relation to reservoir boundaries and reservoir regions based on the permeability thresholds in accordance with one or more embodiments. For example, where the well data corresponds to data points similar to the data points shown in FIG. 3.1 above, the well data may be associated with various reservoir regions (e.g., a non-reservoir quality region and multiple regions with varying degrees of reservoir quality).

In Block 430, a reservoir model is generated that describes various reservoir boundaries of a geological region of interest using a diagenesis-based rock classification scheme in accordance with one or more embodiments. For example, the reservoir model may include reservoir boundaries based on reservoir quality, the existence of seals within a subsurface formation, and/or boundaries distinguishing dolomite from dolomitic limestone (e.g., a half-dolomite boundary line within a porosity-versus-dolomite-volume-fraction diagram).

In some embodiments, dolomitic limestone may be defined as a volume percentage of dolomite in total mineral volume (excluding porosity) that is 0 to 50% and dolomite may be fined as the percentage is 50% to 100%. In another embodiment, the dolomite boundary between dolomite and dolomitic limestone in a reservoir model may include a porosity value in the denominator of the calculation for a dolomite volume fraction value. For example, a half-dolomite boundary line may be included in a porosity-versus-dolomite-volume-fraction diagram may be expressed by the following equation:

$$\text{Dolomite volume fraction} = (1-\text{porosity})/2 \quad \text{Equation (5)}$$

where the half-dolomite boundary line separates dolomite from dolomitic limestone as shown by the dolomite-dolomitic limestone boundary (561) in FIG. 5.1 below.

In Block 435, a sealing capacity analysis is determined for a geological region of interest using a reservoir model in accordance with one or more embodiments. For example, the sealing capacity analysis may be performed by a reservoir simulator to identify the existence of a hydrocarbon trap as well as a quantity of hydrocarbons within a subsurface formation.

In Block 440, a diagenesis-based sealing capacity model is determined using a reservoir model and a sealing capacity analysis in accordance with one or more embodiments. In particular, a sealing capacity analysis may be updated using dolomite boundaries within a reservoir model. Likewise, the diagenesis-based facies modeling may distinguish stratigraphic traps from diagenetic traps with the reservoir model. For example, area A in the geological region of interest may develop a stratigraphic trap (e.g., porous limestone against tight limestone) and area B may develop a diagenetic trap (i.e., porous dolomite against tight dolomite).

In Block 445, one or more diagenesis-based facies of a geological region of interest are determined using the diagenesis-based sealing capacity model in accordance with one or more embodiments. For example, a reservoir model may further identify various types of facies within a reservoir model, and in particular diagenesis-based facies.

In Block 450, a reservoir model is updated using seismic data in accordance with one or more embodiments. For example, In areas of interest with insufficient drilled wells during exploration, there may be an insufficient amount of well logs or core samples to determine a reservoir model for a geological region of interest. Accordingly, in some embodiments, a well-seismic modeling approach may be used to generate a complete reservoir model for the geological region of interest. Seismic attributes from seismic data, such as amplitude measurements and impedance may be used as controlling factors to improve the facies within a reservoir model. In another embodiment, well testing data may used to verify the facies prediction results from a particular reservoir model for a geological region of interest.

In Block 455, a stratigraphic and diagenetic trap prediction is determined using a reservoir model. For example, stratigraphic and diagenetic traps may be identified in a similar manner as the hydrocarbon traps described above in Blocks 240 from FIG. 2, and the accompanying description.

Turning to FIGS. 5.1 and 5.2, FIGS. 5.1 and 5.2 provide examples of reservoir models generated using a diagenesis-based rock classification scheme. The following examples are for explanatory purposes only and not intended to limit the scope of the disclosed technology. Turning to FIG. 5.1, FIG. 5.1 shows a reservoir model with six reservoir regions: a good dolomitic limestone reservoir region (510), a good dolomite reservoir region (520), a fair dolomitic limestone reservoir region (530), a fair dolomite reservoir region (540), a dolomitic limestone non-reservoir region (550), and a dolomitic non-reservoir region (560). In particular, a dolomite-dolomitic limestone boundary (561) is a half-line boundary that separates the dolomite regions from the dolomitic limestone regions within the reservoir model. Likewise, two permeability thresholds correspond to a good reservoir-fair reservoir boundary (563) and a fair reservoir-non-reservoir boundary (564). Further, a maximum porosity boundary (562) borders the reservoir regions (520, 540, 560). The reservoir boundaries (563, 564) may be performed by linear regressions of corresponding data points from a porosity-versus-permeability analysis.

Turning to FIG. 5.2, FIG. 5.2 shows a reservoir model with only reservoir regions (i.e., dolomitic limestone reservoir region (570) and dolomite reservoir region (575)) and non-reservoir regions (i.e., a dolomitic limestone non-reservoir region (550) and a dolomitic non-reservoir region (560)). Thus, the reservoir model in FIG. 5.2 is simplified from the reservoir model in 5.1, while illustrating different non-reservoir regions for determining an existence of a hydrocarbon trap.

Embodiments may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform all or a portion of one or more embodiments of the disclosure.

The computing system or group of computing systems described in FIGS. 6.1 and 6.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (600) in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6.1, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6.1 and the nodes and/or client device in FIG. 6.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
   obtaining, by a computer processor, a plurality of well logs or a plurality of core samples regarding a geological region of interest;
   determining, by the computer processor, a plurality of permeability values, a plurality of porosity values, and a plurality of dolomite volume fraction values regarding the geological region of interest using the plurality of well logs or the plurality of core samples, wherein the plurality of dolomite volume fraction values correspond to a percentage of dolomite in a total mineral volume;
   determining, by the computer processor and using the plurality of porosity values, a plurality of permeability thresholds corresponding to a plurality of predetermined reservoir qualities;
   generating, by the computer processor and using the plurality of permeability thresholds, the plurality of permeability values, and the plurality of dolomite volume fraction values, a reservoir model comprising a plurality of dolomite boundaries defining the plurality of predetermined reservoir qualities; and
   determining, by the computer processor, a hydrocarbon trap prediction using the reservoir model.

2. The method of claim 1, further comprising:
   determining a predetermined maximum porosity boundary for the reservoir model; and
   adjust the predetermined maximum porosity boundary based on an anhydrite volume fraction value in the geological region of interest to produce an adjusted porosity boundary.

3. The method of claim 2,
   wherein the plurality of dolomite boundaries comprise a dolomitic limestone boundary that separates dolomite from dolomitic limestone within the geological region of interest, and
   wherein the dolomitic limestone boundary is determined using the plurality of dolomite fraction values and the adjusted porosity boundary.

4. The method of claim 1,
   wherein the plurality of permeability thresholds comprise a predetermined reservoir quality threshold that separates a first reservoir region having impervious rock from a second reservoir region having semi-pervious rock.

5. The method of claim 1, further comprising:
   generating a reservoir boundary by performing a linear regression using a subset of the plurality of permeability values and a permeability-versus-porosity analysis.

6. The method of claim 1, further comprising:
   generating, by a control system, a control signal for a drilling system using the hydrocarbon trap prediction, and
   wherein the control signal adjusts a well trajectory of the drilling system.

7. The method of claim 1, further comprising:
   determining, using the reservoir model, a first sealing capacity of a first formation in the geological region of interest and a second sealing capacity of a second formation in the geological region of interest,
   wherein the hydrocarbon trap is a diagenetic trap, and
   wherein the first formation is a hydrocarbon seal for the diagenetic trap and the second formation is a non-seal.

8. The method of claim 1, further comprising:
   obtaining seismic data regarding the geological region of interest;
   determining a diagenesis-based facies within the reservoir model; and
   upscaling, using the seismic data, the diagenesis-based facies throughout the reservoir model.

9. The method of claim 1,
   wherein the computer processor is disposed in a reservoir simulator coupled to a control system and a drilling system in a well environment.

10. A system, comprising:
    a logging system coupled to a plurality of logging tools,
    a reservoir simulator comprising a computer processor, wherein the reservoir simulator is coupled to the logging system and comprises functionality for:
       obtaining a plurality of well logs from the plurality of logging tools or a plurality of core samples regarding a geological region of interest;

determining a plurality of permeability values, a plurality of porosity values, and a plurality of dolomite volume fraction values regarding the geological region of interest using the plurality of well logs or the plurality of core samples, wherein the plurality of dolomite volume fraction values correspond to a percentage of dolomite in a total mineral volume;

determining, using the plurality of porosity values, a plurality of permeability thresholds corresponding to a plurality of predetermined reservoir qualities;

generating, using the plurality of permeability thresholds, the plurality of permeability values, and the plurality of dolomite volume fraction values, a reservoir model comprising a plurality of dolomite boundaries defining the plurality of predetermined reservoir qualities; and determining a hydrocarbon trap prediction using the reservoir model.

11. The system of claim 10, wherein the reservoir simulator further comprises functionality for:
determining a predetermined maximum porosity boundary for the reservoir model; and
adjust the predetermined maximum porosity boundary based on an anhydrite volume fraction value in the geological region of interest to produce an adjusted porosity boundary,
wherein the plurality of dolomite boundaries comprise a dolomitic limestone boundary that separates dolomite from dolomitic limestone within the geological region of interest, and
wherein the dolomitic limestone boundary is determined using the plurality of dolomite fraction values and the adjusted porosity boundary.

12. The system of claim 10, wherein the plurality of permeability thresholds comprise a predetermined reservoir quality threshold that separates a first reservoir region having impervious rock from a second reservoir region having semi-pervious rock.

13. The system of claim 10, further comprising:
a control system coupled to the reservoir simulator and a drilling system,
wherein the control system is configured to generate a control signal for the drilling system using the hydrocarbon trap prediction, and
wherein the control signal adjusts a well trajectory of a drilling system.

14. The system of claim 10, wherein the reservoir simulator further comprises functionality for:
determining, using the reservoir model, a first sealing capacity of a first formation in the geological region of interest and a second sealing capacity of a second formation in the geological region of interest,
wherein the hydrocarbon trap is a diagenetic trap, and
wherein the first formation is a hydrocarbon seal for the diagenetic trap and the second formation is a non-seal.

15. The system of claim 10, wherein the reservoir simulator further comprises functionality for:
obtaining seismic data regarding the geological region of interest;

determining a diagenesis-based facies within the reservoir model; and
upscaling, using the seismic data, the diagenesis-based facies throughout the reservoir model.

16. A non-transitory computer readable medium storing instructions executable by a computer processor, the instructions comprising functionality for:
obtaining a plurality of well logs or a plurality of core samples regarding a geological region of interest;
determining a plurality of permeability values, a plurality of porosity values, and a plurality of dolomite volume fraction values regarding the geological region of interest using the plurality of well logs or the plurality of core samples, wherein the plurality of dolomite volume fraction values correspond to a percentage of dolomite in a total mineral volume;
determining, using the plurality of porosity values, a plurality of permeability thresholds corresponding to a plurality of predetermined reservoir qualities;
generating, using the plurality of permeability thresholds, the plurality of permeability values, and the plurality of dolomite volume fraction values, a reservoir model comprising a plurality of dolomite boundaries defining the plurality of predetermined reservoir qualities; and
determining a hydrocarbon trap prediction using the reservoir model.

17. The non-transitory computer readable medium of claim 16, wherein the instructions further comprise functionality for:
generating a control signal for a drilling system using the hydrocarbon trap prediction, and
wherein the control signal adjusts a well trajectory of the drilling system.

18. The non-transitory computer readable medium of claim 16, wherein the plurality of permeability thresholds comprise a predetermined reservoir quality threshold that separates a first reservoir region having impervious rock from a second reservoir region having semi-pervious rock.

19. The non-transitory computer readable medium of claim 16, wherein the instructions further comprise functionality for:
determining a predetermined maximum porosity boundary for the reservoir model; and
adjust the predetermined maximum porosity boundary based on an anhydrite volume fraction value in the geological region of interest to produce an adjusted porosity boundary,
wherein the plurality of dolomite boundaries comprise a dolomitic limestone boundary that separates dolomite from dolomitic limestone within the geological region of interest, and
wherein the dolomitic limestone boundary is determined using the plurality of dolomite fraction values and the adjusted porosity boundary.

20. The non-transitory computer readable medium of claim 16, wherein the reservoir model comprises a reservoir boundary that is generated by performing a linear regression using a subset of the plurality of permeability values and a permeability-versus-porosity analysis.

* * * * *